US010534756B1

(12) United States Patent  
Cairns (10) Patent No.: US 10,534,756 B1  
(45) Date of Patent: Jan. 14, 2020

(54) SYSTEMS AND METHODS FOR CROSS-REFERENCING ELECTRONIC DOCUMENTS ON DISTRIBUTED STORAGE SERVERS

(71) Applicant: Google Inc., Mountain View, CA (US)

(72) Inventor: Brian Lewis Cairns, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 487 days.

(21) Appl. No.: 15/139,582

(22) Filed: Apr. 27, 2016

(51) Int. Cl.

| | |
|---|---|
| *G06F 17/30* | (2006.01) |
| *G06F 7/00* | (2006.01) |
| *G06F 16/176* | (2019.01) |
| *H04L 29/08* | (2006.01) |
| *H04L 29/06* | (2006.01) |
| *G06F 16/23* | (2019.01) |
| *G06F 16/245* | (2019.01) |

(52) U.S. Cl.  
CPC .......... *G06F 16/1774* (2019.01); *G06F 16/23* (2019.01); *G06F 16/245* (2019.01); *H04L 65/403* (2013.01); *H04L 67/1097* (2013.01); *H04L 67/2842* (2013.01)

(58) Field of Classification Search  
CPC ......... G06F 17/30171; G06F 17/30345; G06F 17/30424; H04L 67/1097; H04L 65/403; H04L 67/2842  
USPC ........................................................ 707/759  
See application file for complete search history.

(56) References Cited

U.S. PATENT DOCUMENTS

| | | | |
|---|---|---|---|
| 6,052,514 A * | 4/2000 | Gill .................... | G06F 17/24 |
| | | | 707/E17.009 |
| 6,862,592 B1 * | 3/2005 | Flenniken ........... | G06F 17/30011 |
| 2011/0202437 A1 * | 8/2011 | Nambiar ............... | G06Q 30/04 |
| | | | 705/30 |
| 2015/0055169 A1 * | 2/2015 | Tan ...................... | G06F 3/1237 |
| | | | 358/1.15 |
| 2015/0373101 A1 * | 12/2015 | Cox .................... | H04L 67/1095 |
| | | | 710/303 |

* cited by examiner

*Primary Examiner* — Kuen S Lu  
(74) *Attorney, Agent, or Firm* — Lowenstein Sandler LLP (57) ABSTRACT

Systems and methods are described to provide consistent cross-reference between electronic documents from distributed storage servers. A first document server may receive a query relating to a first document referencing a second document. The first document is stored on the first document server, and the second document is stored on a second document server. The first document server may obtain data relating to a copy of the second document associated with a revision number. The first document server may then send, to the second document server, an update request including the revision number, and then receive from the second document server, data relating to operations that have been committed to the second document after a time associated with the revision number. The first document server may apply the operations that have been committed to the second document to update the copy of the second document, and respond to the query based on a previously stored copy of the first document and the updated copy of the second document.

20 Claims, 5 Drawing Sheets

SYSTEMS AND METHODS FOR CROSS-REFERENCING ELECTRONIC DOCUMENTS ON DISTRIBUTED STORAGE SERVERS

FIELD OF THE INVENTION

In general, this disclosure relates to managing collaboratively editable electronic documents stored on a remote server, in particular, to systems and methods for cross-referencing electronic documents on distributed storage servers.

BACKGROUND

An electronic document can be edited by multiple users. For example, the electronic document can be stored at a remote server as a master copy, and a client copy of the electronic document can be saved at a client device such that a user can edit the client copy of the electronic document. Changes made to the client copy can be sent to the remote server to update the master copy of the electronic document. In this way, multiple users can edit the electronic document in a collaborative environment.

At times an electronic document may cross-reference a portion of another electronic document. For example, a spreadsheet may cross-reference a cell in another spreadsheet document. The referencing and referenced electronic documents can be stored on two different distributed storage servers, and thus can be updated asynchronously. The distributed storage of different electronic documents thus makes it difficult to provide a consistent query across multiple different documents.

SUMMARY

Systems and methods disclosed herein provide a platform for a first document stored on a first storage server to load a consistent copy of a referenced second document stored on a second storage server to achieve consistent cross-reference between electronic documents from distributed storage servers. A first document server may receive a query relating to a first document referencing a second document. The first document is stored on the first document server, and the second document is stored on a second document server. The first document server may obtain data relating to a copy of the second document associated with a revision number. The first document server may then send, to the second document server, an update request including the revision number, and then receive from the second document server, data relating to operations that have been committed to the second document after a time associated with the revision number. The first document server may apply the operations that have been committed to the second document to update the copy of the second document, and respond to the query based on a previously stored copy of the first document and the updated copy of the second document.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain embodiments will now be described, including a system and method for managing cross-referencing electronic documents stored on distributed storage servers. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The system and methods described herein provide a platform for a first document stored on a first storage server to load a consistent copy of a referenced second document stored on a second storage server. For example, when a query for a portion of the first document that references the second document takes place, the first storage server may respond to the query by providing the portion of the first document including an up-to-date version of the referenced portion from the second document. In this way, the referenced part from the second document that is provided in connection with the first document is consistent with the version of the second document being currently stored on the second storage server.

Figure 1:
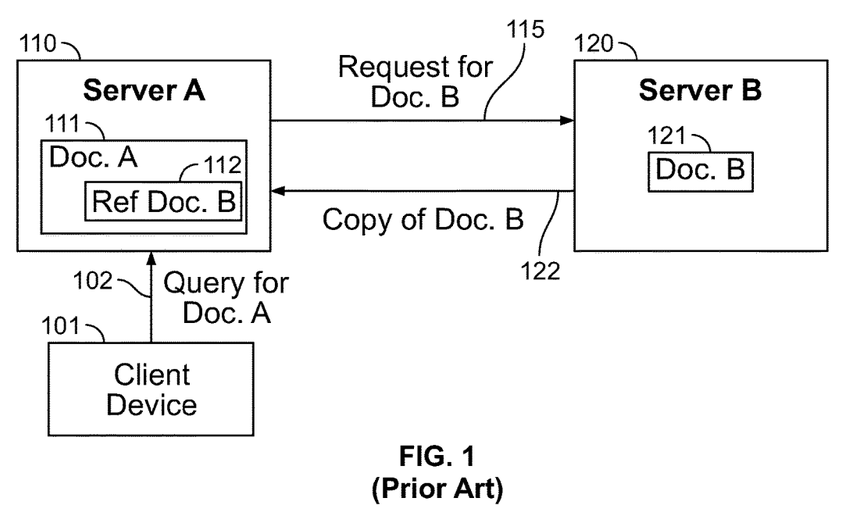
FIG. 1 provides a block diagram illustrating an existing solution for consistent cross-referencing electronic documents stored on distributed servers.

FIG. 1 provides a block diagram illustrating an existing solution for consistent cross-referencing electronic documents stored on distributed servers. As shown in FIG. 1, a collaborative document editing system can be built on an eventually-consistent storage system. For example, the document A 111 stored on storage server A 110, can be accessed and edited by one or more client device(s) 101, and the different versions of the document A 111 can be made eventually consistent across devices. The same applies to document B 121 stored at storage server B 120. Thus when document A 111 references a portion 112 of document B, it is possible that the referenced portion 112 may not be consistent with the exact portion in document B 121, as document B 121 stored on storage server B may be modified after the copy of document B 122 has been transmitted to server A 110.

In the respective example, consistency within a document (e.g., document A 111) can be maintained because only one server (e.g., server A 110) can be configured to hold an exclusive lock to operate on the respective document A 111 at one time and all requests pertaining to document A 111 are forwarded to the lock-holding server, e.g., server A 110. In this way, at any time when an access request from the client device 101 is sent to server A 110 to access document A 111, the copy of document A 111 stored on server A 110 is consistent. However, when two documents are involved, e.g., document A 111 including a reference 112 to document B, it is difficult to configure server A 110 to hold the lock for both documents, as document B 121 is stored on a different server B 120. For example, if server A 110 is required hold the lock for every document that document A 111 referenced, every change to every referenced document needs to be passed on to and processed by server A 110, which may create a significant processing bottleneck for document modification of these referenced documents.

For example, document A 111 can be a spreadsheet loaded on server A 110 which holds the lock on document A. Document A 111, the spreadsheet, may contain a reference 112 to a cell in a second spreadsheet 121. When a client device 101 sends a query 102 that requests both content in the first spreadsheet 111 and the second spreadsheet 121 through the referenced cell 112, one existing solution is to transmit a request 115 for a most up-to-date copy of the second spreadsheet from server B 120, and the server B 120 will return a copy of the second spreadsheet, e.g., an entire copy of document B 122 to server A 110. However, this prior art solution is impractical if the query is complex or results in multiple references being followed, e.g., when documents A and B are database files. Otherwise, server A 110 may just provide the first spreadsheet, e.g., document A 111 with a potentially inconsistent view of the data for the referenced portion 112, which may be seconds or minutes out of date, or in extreme cases even hours out of date.

Figure 2:
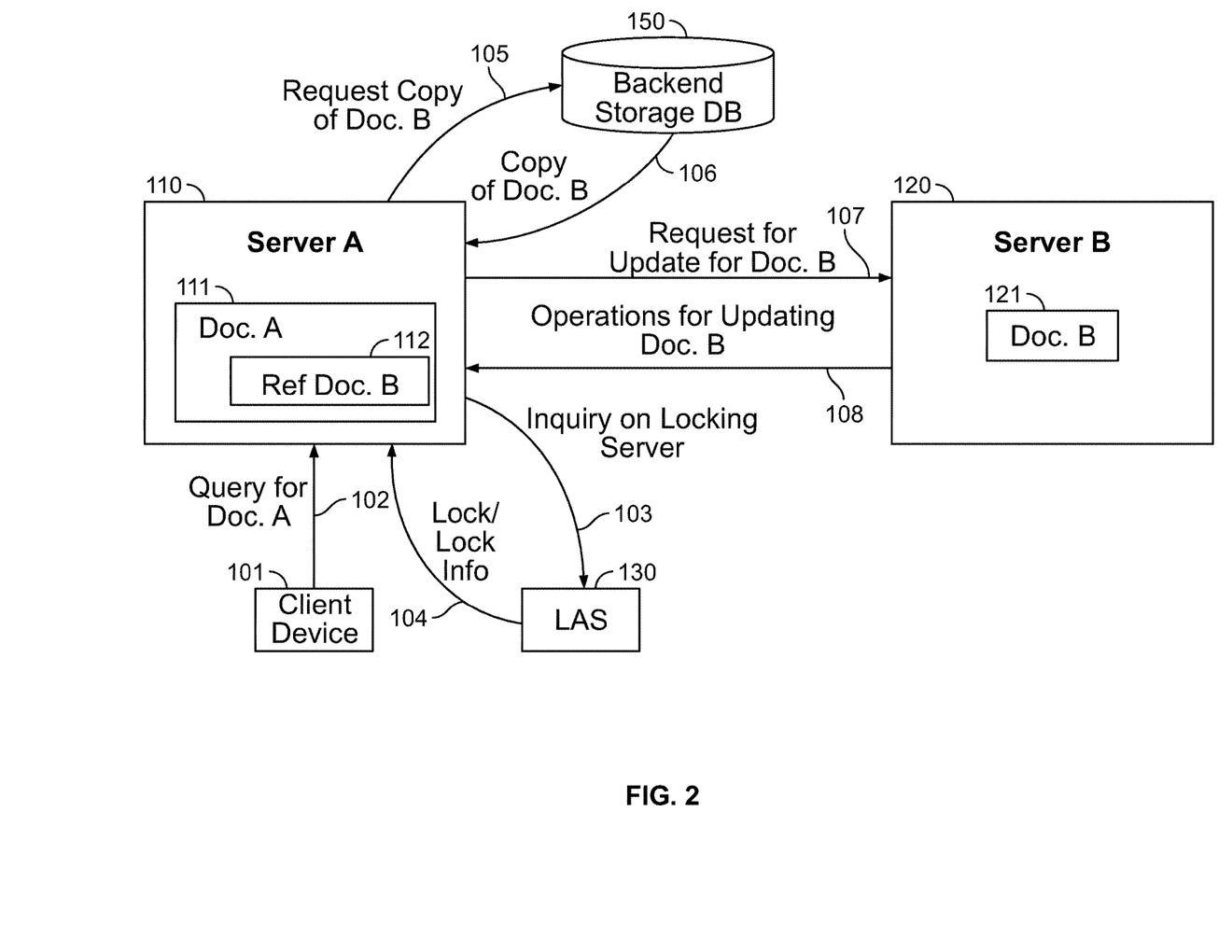
FIG. 2 provides an example data flow diagram illustrating aspects of consistent cross-referencing a document stored on a different distributed storage server, according to an illustrative embodiment.

FIG. 2 provides an example data flow diagram illustrating aspects of consistent cross-referencing a document stored on a different distributed storage server. A backend storage system/database 150, a lock aggregator service (LAS) server 130, one or more distributed document servers 110 and 120, and/or other affiliated entities may interact to consistent cross-referencing between documents stored on different document servers. Specifically, document server A 110 and server B 120 are distributed document servers that can share a same backend storage database 150 and/or the LAS server 130. The backend storage system/database 150, and the LAS 130 may be housed with a document server, or separately from any document server.

At a distributed document server (e.g., server A 110 or server B 120), electronic documents are structured as a log of operations. Every change to a document is represented as an operation, and a backend storage database 150 is employed such that every operation is appended to the operation log in the database. Operations that have been appended to a log are considered completed and are thus not subsequently modified. The backend storage system 150 can be eventually consistent, e.g., documents stored in the form of logs of operations are eventually updated and synchronized with the version on a document server. The backend storage system 150 allows any document server to read the operation log for any document, even if at a specific time instant, the operation log available from the backend storage system 150 relating to a document may not be up-to-date. For example, when a query 102 for document A is received at server A 110, server A 110 may request a copy of document B (at 105) from the backend storage database 150, which may in turn provide an available copy of document B 106 to server A 110, e.g., in the form of an operation log. The available copy of operation log for document B 106 may include a document identifier (ID), a version ID, a timestamp that the document version was last updated, and/or the like.

In one implementation, a document server (e.g., server A 110 or server B 120) can be granted a "lock" on a specific document, e.g., an exclusive right to modify the specific document. For example, when server A 110 has the lock on document A 111, all changes to document A 111 need to be passed on to and handled by server A 110. Thus server A 110 will always have the most up-to date version of document A 111. A lock aggregator service (LAS) server 130 can be employed to provide locking server information relating to a specific document. For example, server A 110 may send an inquiry 103 to LAS 130 to ask which is the locking server for document B 121. The LAS 130 may send locking server information 104 relating to document B 121 back to server A 110. Alternatively, server A may send a request for a lock on a document (e.g., document A 111) to LAS 130, and LAS 130 may grant a lock to server A 110 on document A 111.

When documents are defined as a sequence of operations, server A 110 does not need to load an entire copy of document B 121 from server B 120 every time a query to document A 111 takes place. For example, server A 110 may send a request 107 for updated operations since the version 106 to server B 120, which may in turn provide a list of operations 108 to document B 121 since a revision ID or revision timestamp. In this way, a document server can efficiently load a consistent, read-only copy of a document on the document server that does not hold an exclusive lock for that document. The heavy communication overhead for loading a large document for cross-referencing between distributed document servers, e.g., server A 110 and server B 120, has been reduced, and communication efficiency and latency performance is thus improved.

Figure 3A:
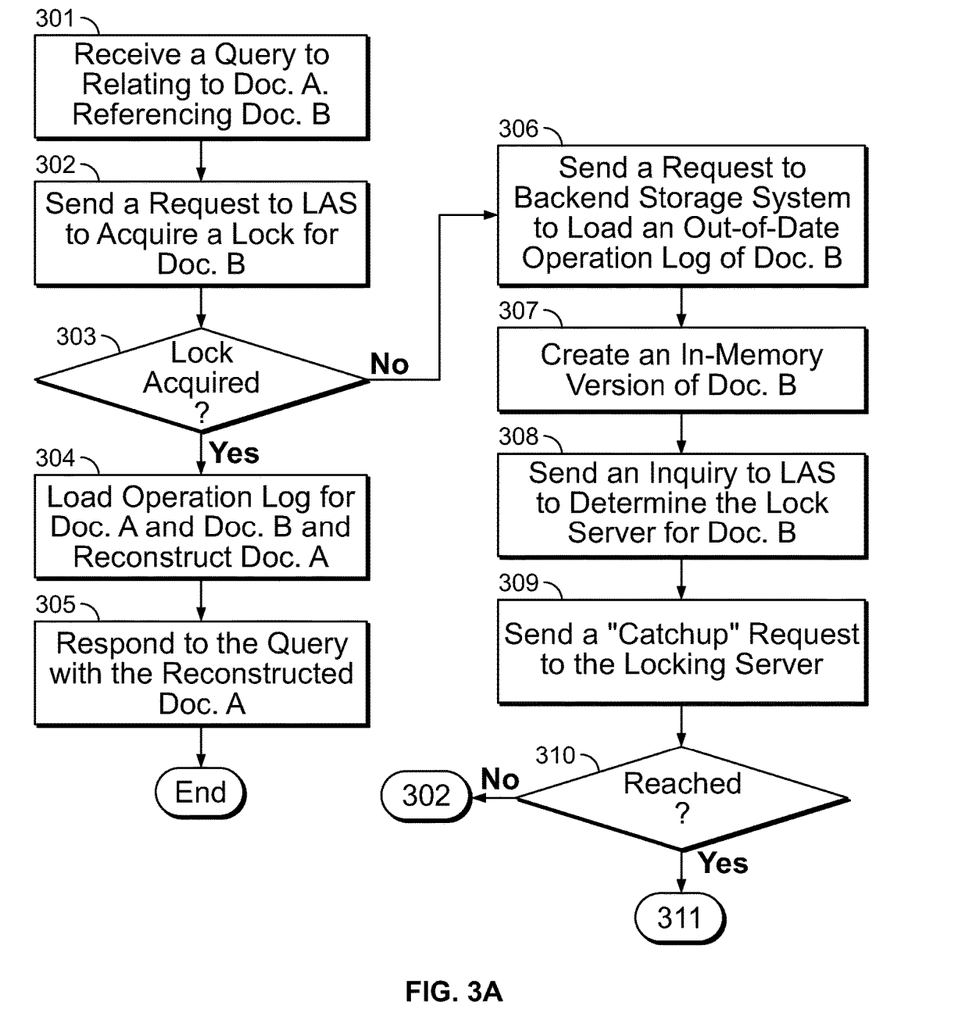
FIGS. 3A-3B provide a logic flow diagram illustrating aspects of the work flow of obtaining consistent cross-referenced portions between distributed document servers, according to an illustrative embodiment.
Figure 3B:
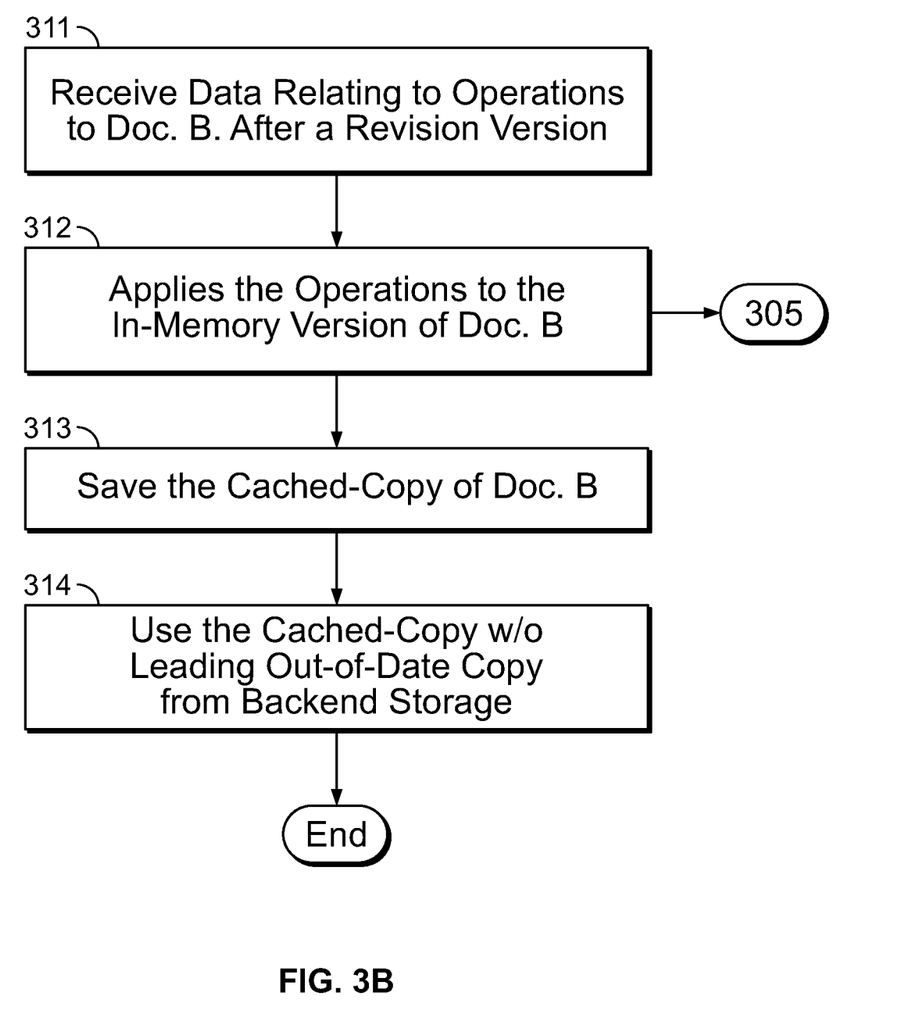

FIGS. 3A-3B provide a logic flow diagram illustrating aspects of the work flow of obtaining consistent cross-referenced portions between distributed document servers. At 301, a first server receives a query, which includes data both from a first document (e.g., document A 111 in FIG. 2) and a second document (e.g., document B 121 in FIG. 2) referenced by the first document. The first server holds the lock for the first document, but may or may not hold the lock for the second document.

At 302, the first server may attempt to acquire a lock from the distributed locking system (e.g., LAS 130 in FIG. 2) for the second document. If the lock is acquired at 303, then the first server may proceed to load the operation log for both the first document and the second document, and reconstruct the document (e.g., document A referencing document B) in-memory based on the operation log, e.g., at 304. The first server may respond to the query with the reconstructed document at 305, and the process ends.

If the lock is not acquired at 303, e.g., the lock for the second document, document B, may be held by another server, the first server may send a request to the backend storage system to load an available (maybe out-of-date) operation log for the second document at 306. The operation log may include a revision number of the most recent change. The storage system may return an up-to-date operation log, or a log that is out-of-date without affecting the eventual consistency of cross-referencing.

At 307, the first server may replay the operation log loaded from the storage system to create an in-memory version of the second referenced document. At 308, the first server may send an inquiry to the distributed locking system (e.g., LAS 130 in FIG. 2) to determine the lock holder for the referenced document, e.g., server B 120 in FIG. 2.

At 309, the first server can send a "catchup" request to the lock holder server for the second document, including the document ID of the second referenced document and the revision number that the first server received from the storage system. If the lock holder server cannot be reached at 310, the first server may attempt to serve the "catchup" request itself by acquiring the lock for the second document, e.g., returning to 302. If the first server cannot acquire the lock, the request is deemed failed.

If the lock holder is reached at 310, the second server (e.g., the lock holder server) may use its consistent view of the second referenced document to return the operations (if any) that were committed to the second referenced document after the revision number that is provided by the first server. Thus at 311, the first server may receive data relating to operations to the second document after the revision number. At 312, the first server may apply the operations returned by the second server (the lock holder) to the first server's in-memory version of the second referenced document. Thus with a consistent version of the second referenced document, the first server can serve the query including data from the referenced document, e.g., at 305.

In one implementation, at 313, the first server may optionally save and hold a cached copy of the second referenced document for a period of time. In this way, if the first server receives a request which requires data from the second document in the future, it may not need to load any operation log relating to the second document from the backend storage system. Instead, at 314, the first server can use the cached-copy of the second document, and send request to the second server for updated operations that are committed after a revision number associated with the cached-copy.

In one implementation, when a document references more than one document, the method and system for consistent cross-referencing still applies. The document server (e.g., server A 110) may perform consistent cross-referencing for each referenced document in a similar process as shown in FIGS. 3A-3B.

As shown in FIGS. 2-3B, if the storage system (e.g., 150 in FIG. 2) has reasonable replication performance, the referenced document loaded at 306 in FIG. 3A is almost or completely up-to-date with respect to the consistent version. This means that the request made at 309 in FIG. 3A may return relatively little data, which decreases the amount of data that must be transferred potentially long distances across the network. In contrast, if an entire copy of the referenced document needs to be loaded from the lock holder server across the network, more bandwidth is needed and higher latency may be incurred than reading from the backend storage system, as there is usually only one lock holder server whereas data in the storage system can be replicated in multiple places for efficiency. Moreover, as there is usually only one lock holder for one document, there is an incentive to reduce the amount of time that the lock holder spends serving requests to avoid creating performance hot-spots on that lock holder server, e.g., serving requests for updated operations is much less complicated than serving an entire document. In addition, the storage system can exhibit high performance because it does not require locking and therefore is not subject to lock contention issues.

As discussed at 313, the server may be provided with a full copy of the referenced document in-memory, which allows maximum flexibility and performance with complex queries. In this way, the document server does not need to read every referenced value individually from the lock holder, and thus avoids performance issues when the first document references a large number of different documents, or if the query requires expensive computation (such as regular expression matching). Also, as the server keeps the cached copy of the second document, and holds the lock for the first document (which references the second document), additional queries which include both the first and second documents are more likely to be consistent with the cache, and thus the server may even skip the "catchup" request at 309 and use the cached copy.

The systems and methods for consistent cross-referencing between electronic documents can be used to implement database-join-style queries in a collaborative database. The collaborative database structure can be analogous to a federated data model. For example, an organization might have a "people" table as well as a "vacation" table, both implemented as independent database documents. In the collaborative database system, any table may cross-reference anywhere from any other table, e.g., to reference tables across organizations, or to share the same data in many different applications. A single table can be associated with each document, such that all cross-table references are also cross-document references. In this way, a user can add relations over time, instead of knowing the relations ahead-of-time to structure data into the correct silos, which is usually performed in traditional databases.

Figure 4:
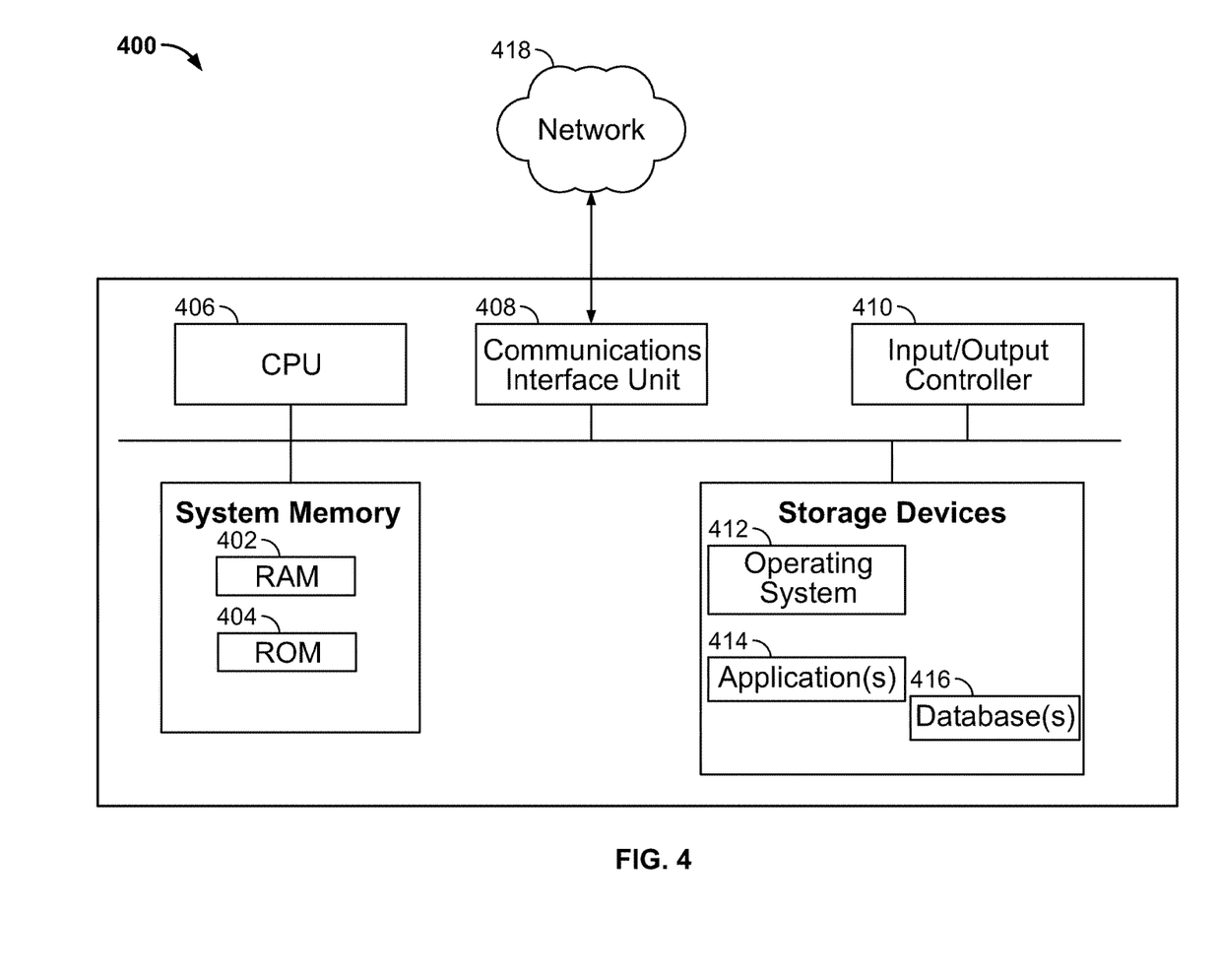
FIG. 4 is a block diagram illustrating an exemplary computer system 400 with which the system for consistent cross-references across different documents on distributed document servers and use of FIGS. 2-3B can be implemented, according to an illustrative embodiment.

FIG. 4 is a block diagram illustrating an exemplary computer system 400 with which the system for consistent cross-references across different documents on distributed document servers and use of FIGS. 2-3B can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the service, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via an input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the system for consistent cross-referencing across documents on distributed storage servers as shown in FIGS. 2A-7, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the processes described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, an enterprise server or group of servers, one or more desktop computers, one or more laptop computers, etc. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method of providing consistent cross-reference between electronic documents from distributed storage servers, the method comprising:
   receiving, at a first document server, a query relating to a first document referencing a second document, wherein the first document is stored on the first document server, and wherein the second document is defined using a sequence of operations and is stored on a second document server;
   obtaining data relating to a copy of the second document associated with a revision number;
   sending, to the second document server, an update request including the revision number;
   receiving, from the second document server, a list of additional operations that have been committed to the second document after a time associated with the revision number;
   applying, at the first document server, the additional operations that have been committed to the second document to update the copy of the second document; and
   responding to the query based on a previously stored copy of the first document and the updated copy of the second document.

2. The method of claim 1, wherein the first document server has an exclusive right to modify the first document.

3. The method of claim 1, further comprising:
   sending, to a lock aggregator service server, an inquiry for information on a modification right relating to the second document; and
   receiving, from the lock aggregator service server, an indication that the second document server has an exclusive right to modify the second document.

4. The method of claim 1, wherein the data relating to the copy of the second document associated with the revision number includes an operation log, and the method further comprising:
   obtaining the operation log from a backend storage system; and
   reconstructing the copy of the second document based on the operation log.

5. The method of claim 1, wherein the data relating to the copy of the second document associated with the revision number includes a cached-copy of the second document that is previously cached at the first document server.

6. The method of claim 1, further comprising:
   sending a lock request to a lock aggregator service server for an exclusive right to modify the second document; and
   responding to the query based on the previously stored copy of the first document and the copy of the second document when the exclusive right to modify the second document is granted to the first document server.

7. The method of claim 1, wherein the first document includes any of a text document, a spreadsheet, and a database file.

8. The method of claim 1, wherein the second document server saves the second document in a form of a series of operation logs, and determines one or more operations that have been committed to the second document after the time associated with the revision number.

9. The method of claim 1, wherein the first document further references a third document stored on a third document server, and wherein the third document server has an exclusive right to modify the third document.

10. The method of claim 9, wherein the revision number is a first revision number, wherein the update request is a first update request, and wherein the time is a first time, and the method further comprising:
    obtaining data relating to a copy of the third document associated with a second revision number;
    sending, to the third document server, a second update request including the second revision number;
    receiving, from the third document server, data relating to operations that have been committed to the third document after a second time associated with the second revision number; and
    applying the operations that have been committed to the third document to update the copy of the third document.

11. A system for providing consistent cross-reference between electronic documents from distributed storage servers, the system comprising:
    a first document server storing a first document, the first document server to:
    receive a query relating to a first document referencing a second document, the second document being defined using a sequence of operations and being stored on a second document server;
    obtain data relating to a copy of the second document associated with a revision number;
    send, to the second document server, an update request including the revision number, and receive, from the second document server, a list of additional operations that have been committed to the second document after a time associated with the revision number;
    apply the additional operations that have been committed to the second document to update the copy of the second document, and
    respond to the query based on a previously stored copy of the first document and the updated copy of the second document.

12. The system of claim 11, wherein the first document server has an exclusive right to modify the first document.

13. The system of claim 11, wherein the first document server is further configured to:
    send, to a lock aggregator service server, an inquiry for information on modification right relating to the second document; and
    receive, from the lock aggregator service server, an indication that the second document server has an exclusive right to modify the second document.

14. The system of claim 11, wherein the data relating to the copy of the second document associated with the revision number includes an operation log or a cached copy of the second document that is previously cached at the first document server, and the first document server is further configured to:
    obtain the operation log from a backend storage system; and
    reconstruct the copy of the second document based on the operation log.

15. The system of claim 11, wherein the first document server is further configured to:
    send a lock request to a lock aggregator service server for an exclusive right to modify the second document; and
    respond to the query based on the previously stored copy of the first document and the copy of the second document when the exclusive right to modify the second document is granted to the first document server.

16. The system of claim 11, wherein the first document includes any of a text document, a spreadsheet, and a database file.

17. The system of claim 11, wherein the second document server saves the second document in a form of a series of operation logs, and determines one or more operations that have been committed to the second document after the time associated with the revision number.

18. The system of claim 11, wherein the first document further references a third document stored on a third document server, and wherein the third document server has an exclusive right to modify the third document.

19. The system of claim 18, wherein the revision number is a first revision number, wherein the update request is a first update request, and wherein the time is a first time, and the first document server is further configured to:
   obtain data relating to a copy of the third document associated with a second revision number;
   send, to the third document server, a second update request including the second revision number;
   receive, from the third document server, data relating to operations that have been committed to the third document after a second time associated with the second revision number; and
   apply the operations that have been committed to the third document to update the copy of the third document.

20. A non-transitory computer-readable storage medium storing processor-executable instructions for providing consistent cross-reference between electronic documents from distributed storage servers, the processor-executable instructions, when executed by a processor at a first document server, cause the processor to:
   receive, at the first document server, a query relating to a first document referencing a second document,
   wherein the first document is stored on the first document server, and wherein the second document is defined using a sequence of operations and is stored on a second document server;
   obtain data relating to a copy of the second document associated with a revision number;
   send, to the second document server, an update request including the revision number;
   receive, from the second document server, a list of additional operations that have been committed to the second document after a time associated with the revision number;
   apply, at the first document server, the additional operations that have been committed to the second document to update the copy of the second document; and
   respond to the query based on a previously stored copy of the first document and the updated copy of the second document.

* * * * *